(12) United States Patent
Martinez et al.

(10) Patent No.: US 7,663,972 B2
(45) Date of Patent: Feb. 16, 2010

(54) METHOD FOR THREE DIMENSIONAL SEISMIC TRAVEL TIME TOMOGRAPHY IN TRANSVERSELY ISOTROPIC MEDIA

(75) Inventors: Ruben D. Martinez, Sugar Land, TX (US); Junru Jiao, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 12/070,966

(22) Filed: Feb. 22, 2008

(65) Prior Publication Data

US 2009/0213692 A1 Aug. 27, 2009

(51) Int. Cl.
G01V 1/00 (2006.01)
(52) U.S. Cl. ........................................... 367/52
(58) Field of Classification Search ............. 367/38–40, 367/50–52; 702/18
See application file for complete search history.

(56) References Cited

U.S. PATENT DOCUMENTS

| | | | |
|---|---|---|---|
| 6,826,484 B2 | 11/2004 | Martinez et al. | |
| 6,864,890 B2 * | 3/2005 | Meek et al. | 345/440 |
| 6,985,405 B2 * | 1/2006 | Ren et al. | 367/52 |
| 2004/0041815 A1 | 3/2004 | Meek et al. | |

OTHER PUBLICATIONS

Leon A. Thomsen, "Weak elastic anisotropy", (1986), pp. 1954-1966, Society of Exploration Geophysicist, Geophysics, vol. 51, No. 10.

Ilya Tsvankin, Leon Thomsen, "Inversion of reflection traveltimes for transverse isotropy", (1995), pp. 1095-1107, Society of Exploration Geophysicists, Geophysics, vol. 60, No. 4.

Hongbo Zhou, Don Pham, Samuel Gray, Bin Wang, "3-D tomographic velocity analysis in transversely isotropic media", (2003), pp. 650-653, 73rd SEG Annual Technical Conference, Expanded Abstracts.

Jianxin Yuan, Xiaochun Ma, Sonny Lin, David Lawrey, "P-wave tomographic velocity updating in 3D inhomogeneous VTI media", (2006), pp. 3368-3372, 76th SEG Annual Technical Conference, Expanded Abstracts.

(Continued)

*Primary Examiner*—Jack W. Keith
*Assistant Examiner*—Krystine Saito
(74) *Attorney, Agent, or Firm*—E. Eugene Thigpen; Richard A. Fagin (57) ABSTRACT

A method for estimating seismic velocities in vertically transversely isotropic media includes generating an initial estimate of vertical interval velocity and interval normal moveout velocity with respect to depth from seismic data. An initial estimate is generated of a first anisotropy parameter with respect to depth. The first anisotropy parameter is related to the interval normal moveout velocity and the interval vertical velocity. An initial estimate is generated with respect to depth of a second anisotropy parameter. The second anisotropy parameter is related to the first anisotropy parameter and an interval anelliptic parameter. A first tomographic inversion is performed with respect to the interval normal moveout velocity and the second anisotropy parameter at a constant value of the first anisotropy parameter until travel time differentials reach minimum values. Layer depths are adjusted with the initial estimate of vertical interval velocity. Using values of the second anisotropy parameter determined in the first tomographic inversion, a second tomographic inversion is performed of interval normal moveout velocity and the first anisotropy parameter with respect to depth. The adjusted layer depths, interval normal moveout velocities and interval vertical velocities are again adjusted and interval anelliptic parameters are calculated from the second tomographic inversion.

30 Claims, 6 Drawing Sheets

OTHER PUBLICATIONS

Dairo Cegani, Eduardo Berendson, Clive Hurst, Helen Delome, Ruben D. Martinez, "Anisotropic prestack depth migration improves the well-ties at the Ewing Bank Oil Field Gulf of Mexico", (2003), pp. 746-749, 73 Ann. Int'l Mtg., Soc. Expl. Geophys., Expanded Abstracts.

Ruben Dairo Martinez M., "Why do the wells not tie seismic data in depth?", (Oct.-Dec. 2003), pp. 23-40, Bulletin of the Mexican Association of Exploration Geophysicists, vol. 43, No. 4.

R.D. Martinez, G.A. McMechan, "τ-ρ Seismic Data for Viscoilastic Media—Part 2: Linearized Inversion", (1991), pp. 157-181, Geophysical Prospecting, vol. 39, No. 2.

S. Xu, Y. Zhang, T. Huang, "Fat Ray Tomography", (2006), G022, 68th Mtg., EAGE, Expanded Abstracts.

Hui Zhou, Motoyuki Sato, Hongjun Liu; (2005); *Migration Velocity Analysis and Prestack Migration of Common-Transmitter GPR Data*; IEEE Transactions on Geoscience and Remote Sensing, vol. 43, No. 1, pp. 86-91.

Debashish Sarkar, Ilya Tsvankin; (2004); "*Migration velocity analysis in factorized VTI media*"; Geophysics, vol. 69, No. 3, pp. 708-718.

K. Schneiderbauer, European Patent Office, Search Report, dated May 18, 2009.

\* cited by examiner

METHOD FOR THREE DIMENSIONAL SEISMIC TRAVEL TIME TOMOGRAPHY IN TRANSVERSELY ISOTROPIC MEDIA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic data processing. More particularly, the invention relates to methods for producing seismic images of the Earth's subsurface using prestack depth migration.

2. Background Art

Seismic surveying is used to evaluate structures of, compositions of, and fluid content of subsurface earth formations. A particular application for seismic surveying is to infer the presence of useful materials, such as petroleum, in the subsurface earth formations. Generally, seismic surveying includes deploying an array of seismic sensors at or near the Earth's surface, and deploying a seismic energy source near the sensors also at or near the surface. The seismic energy source is actuated and seismic energy emanates from the source, traveling generally downwardly through the subsurface until it reaches one or more acoustic impedance boundaries. Seismic energy is reflected from the one or more impedance boundaries, where it then travels upwardly until being detected by one or more of the sensors. Structure and composition of the subsurface is inferred from the travel time of the seismic energy, and the amplitude and phase of the various frequency components of the seismic energy with respect to the energy emanating from the seismic source.

One class of methods for processing seismic data is known as prestack migration. In processing seismic survey data using prestack migration methods, conceptually energy propagation through the Earth's subsurface may be thought of as follows. Energy from all seismic energy sources used in producing a survey propagates from a subsurface "scatter point" to all the seismic receivers used in acquiring seismic data. Consequently, all recorded traces (called "input" traces for purposes of seismic processing) can contain energy from a particular scatter-point. Because the input traces have a finite recording time, the scattered energy is restricted to traces within the prestack migration "aperture" of the scattering point. An objective of prestack migration is to gather the seismic energy from all the recorded traces within the prestack migration aperture and sum it back to the scatter-point location.

The accuracy of the migration is related to the accuracy of the calculated seismic signal travel times that are used for migrating the data. The key point is to calculate accurate travel times in order to have better migration imaging. In homogeneous media, seismic travel times, as functions of offset (equivalent distance between the source and receiver along the surface) and common imaging point ("CIP"), are determinable by a simple analytical equation, commonly referred to as the double-square root ("DSR") equation. The DSR equation to compute travel times is fundamental in migration. The DSR equation is exact in the sense that there are no error-terms dependent on dip angle and offset angle.

The estimation of interval velocities in the depth domain is required to perform prestack depth migration in isotropic media. Travel time tomography is a preferred method to estimate the interval velocities. However, it has been recognized that when the seismic velocities are affected by anisotropy, the results from prestack depth migration may not be accurate. If anisotropy is ignored in migration processing, positioning of the seismic events in space will be incorrect and energy "focusing" after migration will not be optimum. The foregoing two factors may have important exploration implications, for example, the depths at which formation boundaries are determined to occur by drilling wells through the subsurface may not correspond in depth to formation boundaries determined by processing the seismic data.

A common type of anisotropy is known as vertically transverse isotropy ("VTI"). A medium such as a formation having VTI is described by three parameters: $V_o$ (interval vertical velocity); $\epsilon$ and $\delta$. The latter two parameters are known as "Thomsen's parameters." Thomsen's parameters are described in, Thomsen, Leon A, *Weak elastic anisotropy*, Geophysics, 51, 1954-1966, Society of Exploration Geophysicists (1986).

In three dimensional ("3D") tomography in VTI media, the parameters $V_o$, $\epsilon$ and $\delta$, may be determined in different ways, for example, the parameters may be related to $V_{nmo}$ (interval normal moveout ("NMO") velocity), $V_o$ (interval vertical velocity) and interval $\eta$ (the interval anelliptic parameter). See, for example, U.S. Pat. No. 6,985,405 to Ren et al. and assigned to the assignee of the present invention. $V_{nmo}$ and interval $\eta$ can be related to Thomsen's parameters ($\delta$ and $\epsilon$) by the following expressions:

$$V_{nmo} = V_o \sqrt{1 + 2\delta} ; \tag{1}$$

and $$\eta = \frac{\varepsilon - \delta}{1 + 2\delta} \tag{2}$$

Performing 3D tomographic velocity estimation for VTI media requires estimating either the variables $V_o$, $\delta$ and $\epsilon$, or the variables $V_o$, $V_{nmo}$ and interval $\eta$. Estimating either set of parameters above is theoretically equivalent to estimating the other set based on equations (1) and (2), however, estimating may result in ambiguous solutions for the three parameters $V_o$, $\delta$ and $\epsilon$ if only compressional-wave (P-wave) seismic data are available. See, Tsvankin, I., and L. Thomsen, *Inversion of reflection travel times for transverse isotropy*. Geophysics, 60, no. 4, 1095-1107, Society of Exploration Geophysicists, 1995.

3D tomographic velocity estimation in VTI media has been described in Zhou, H., Pham, D. Gray, S. and Wang, B., *3-D tomographic velocity analysis in transversely isotropic media*, 73$^{rd}$ SEG annual technical conference (2003), Expanded Abstracts and Yuan, J., Ma, X., Lin, S., and Lowrey, D., *P-wave tomographic velocity updating in 3D inhomogeneous VTI media*, 76$^{th}$ SEG annual technical conference (2006), Expanded Abstracts.

There continues to be a need for improved estimation of interval velocities and interval anisotropy parameters for prestack depth migration of seismic data.

SUMMARY OF THE INVENTION

A method for estimating seismic velocities in vertically transversely isotropic media according to one aspect of the invention includes generating an initial estimate of vertical interval velocity and interval normal moveout velocity with respect to depth from seismic data. An initial estimate is generated of a first anisotropy parameter with respect to depth. The first anisotropy parameter is related to the interval normal moveout velocity and the interval vertical velocity. An initial estimate is generated with respect to depth of a second anisotropy parameter. The second anisotropy parameter related to the first anisotropy parameter and an interval anelliptic parameter. A first tomographic inversion is performed with respect to the interval normal moveout velocity and the second anisotropy parameter at a constant value of the first anisotropy parameter until travel time differentials reach minimum values. Layer depths are adjusted in the initial estimate of vertical interval velocity and interval normal moveout velocity. Using values of the second anisotropy parameter determined in the first tomographic inversion, a second tomographic inversion is performed of interval normal moveout velocity and the first anisotropy parameter with respect to depth. The adjusted layer depths, interval normal moveout velocities and interval vertical velocities are again adjusted and interval anelliptic parameters are calculated from the second tomographic inversion.

Another aspect of the invention is a computer program stored in a computer readable medium. A program according to this aspect of the invention includes logic operable to cause a programmable computer to perform the following process for estimating seismic velocities in vertically transversely isotropic media. The process includes generating an initial estimate of vertical interval velocity and interval normal moveout velocity with respect to depth from seismic data. An initial estimate is generated of a first anisotropy parameter with respect to depth. The first anisotropy parameter is related to the interval normal moveout velocity and the interval vertical velocity. An initial estimate is generated with respect to depth of a second anisotropy parameter. The second anisotropy parameter related to the first anisotropy parameter and an interval anelliptic parameter. A first tomographic inversion is performed with respect to the interval normal moveout velocity and the second anisotropy parameter at a constant value of the first anisotropy parameter until travel time differentials reach minimum values. Layer depths are adjusted in the initial estimate of vertical interval velocity and interval normal moveout velocity. Using values of the second anisotropy parameter determined in the first tomographic inversion, a second tomographic inversion is performed of interval normal moveout velocity and the first anisotropy parameter with respect to depth. The adjusted layer depths, interval normal moveout velocities and interval vertical velocities are again adjusted and interval anelliptic parameters are calculated from the second tomographic inversion.

Other aspects and advantages of the invention will be apparent from the following description and the appended claims.

DETAILED DESCRIPTION

Figure 1:
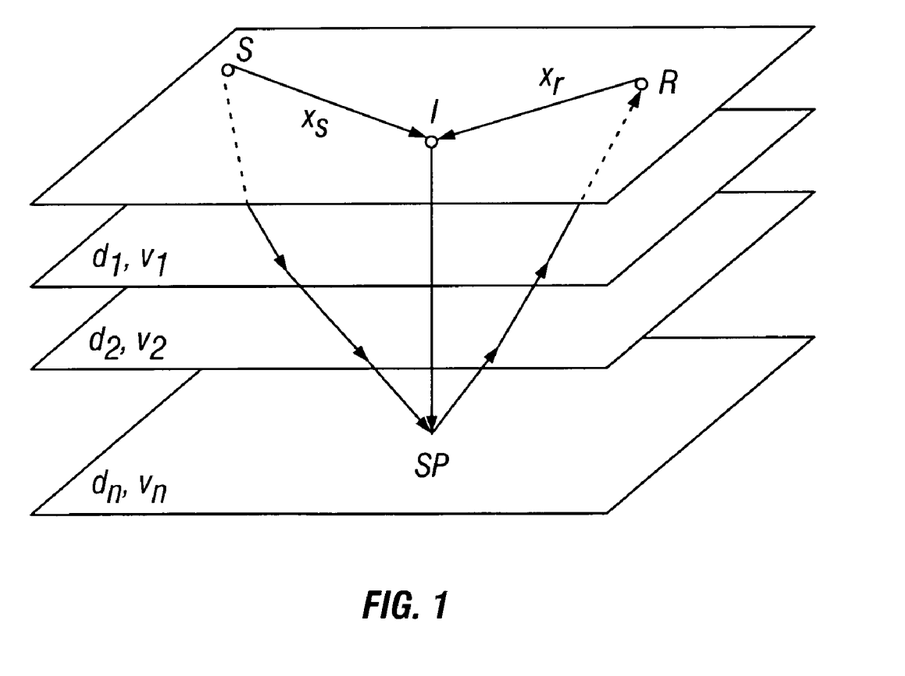
FIG. 1 illustrates the principle of migration.

FIG. 1 shows a seismic energy travel path from a first source position S (geodetic position of a seismic energy source) to a first scatter point SP (a seismic imaging point in the subsurface corresponding to a particular geodetic position at the Earth's surface), and from the first scatter point SP to a first receiver position R (the geodetic position of a seismic receiver at the Earth's surface) The geodetic location at the Earth's surface directly above the first scatter point SP is designated as I, or the imaging location or "image point." FIG. 1 shows the seismic energy travel path from only one source location, to the scatter point and back to only one receiver location. It should be understood that in a three dimensional ("3D") seismic survey, in which there are a plurality of source positions and receiver positions, there is a seismic energy travel path from each source positions to each receiver positions through the scatter point SP. It is the object of the migration process to migrate the seismic energy detected at each receiver position that was reflected from a particular scatter point back to that scatter point. It should also be understood that the foregoing representation is equally applicable to both land-based seismic surveys, in which the source, image and receiver positions are on the land surface, and to marine seismic surveys, where such points may be near the surface or the bottom of a body of water.

As shown in FIG. 1, the Earth may be represented by a plurality of layers, each having a lower boundary depth position represented by $d_1, d_2, \ldots d_n$. The seismic velocity of each layer may be represented by $v_1, v_2, \ldots v_n$. A lateral distance along the Earth's surface between the seismic energy source position and the geodetic position of the image point may be represented by Xs, and a corresponding distance between the image position and the receiver position may be represented by Xr. In a method according to one aspect of the invention, the effective seismic velocity in each layer and a corresponding depth of each layer boundary may be determined where the subsurface formations have velocities that are vertically transversely isotropic. Such formations may be referred to as "VTI media." "Seismic travel time tomographic inversion" as that term or similar terms are used in this description, represents a two- or three-dimensional process that infers seismic velocity distributions of a heterogeneous medium, given a set of seismic energy travel times between known positions of seismic energy sources and seismic receivers at the surface of the Earth or at a similar known datum plane or planes (e.g., the water surface and/or water bottom for marine seismic surveys).

To initialize a three dimensional ("3D") tomographic velocity estimation process for VTI media, initial models for the parameters $V_o$, $\delta$ and $\epsilon$, or the parameters $V_{nmo}$, $V_o$ and $\eta$, as such parameters have been defined herein in the Background of the Invention, are used. Either of the foregoing sets of parameters is functionally equivalent to the other set, as explained with reference to equations (1) and (2) in the Background section herein. The initial models represent initial estimates of the values of the foregoing parameters for each of a plurality of formation layers in the subsurface, such as the layers represented in FIG. 1.

Figure 2:
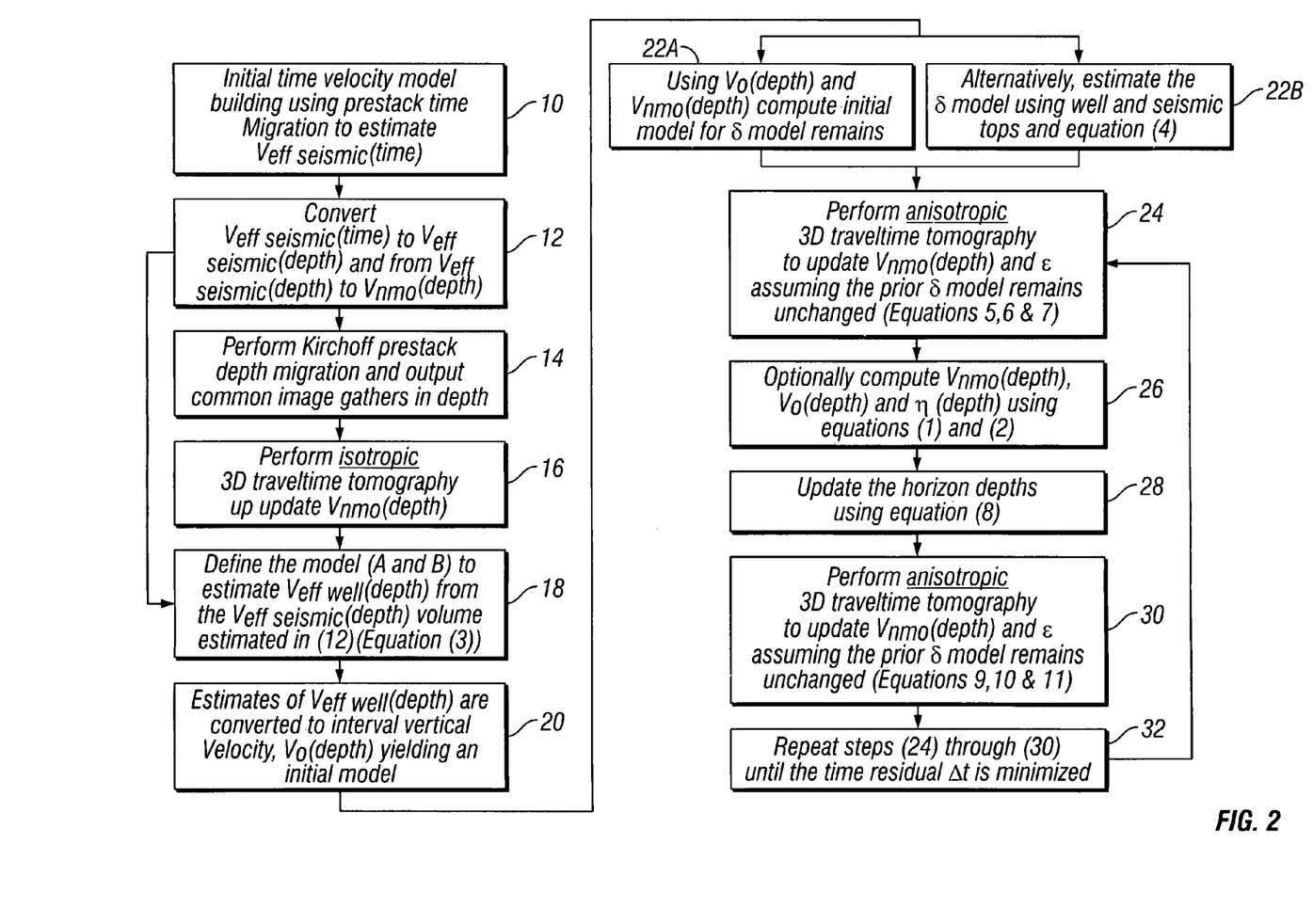
FIG. 2 shows a flow chart of an example process according to the invention.

In one example, an initial model for the parameter $V_{nmo}$ with respect to depth can be obtained from seismic data using time migration velocity analysis techniques known in the art, followed by isotropic (no VTI in the velocity of the layers) tomographic inversion in depth. Referring to FIG. 2, an initial velocity model of horizon or layer velocity with respect to seismic travel time may be determined at 10 using prestack time migration. One example of prestack time migration is described in U.S. Pat. No. 6,826,484 issued to Martinez et al. and assigned to the assignee of the present invention. Prestack time migration velocity analysis may provide the effective seismic velocity of the layers with respect to seismic travel time. At 12, the initial velocity model may be used to determine effective seismic velocity with respect to depth of the various layers in the subsurface. Such effective velocity with respect to depth may then be converted to interval normal moveout ("NMO") velocity with respect to depth. At 14, the interval NMO velocities may be used to perform prestack depth migration, a result of which is the generation of common image gathers with respect to depth. At 16, the common image gathers may be further processed by isotropic 3D travel time tomography to update the initial model of NMO velocity ($V_{nmo}$) with respect to depth.

An initial model for the Thomsen parameter δ with respect to depth may then be obtained from, for example, data from one or more wellbores drilled through the subsurface (such data defined below) using one of two different methods described below.

Method 1 for initially estimating δ with respect to depth: RMS (root mean square) or "effective" seismic velocities can be derived from conventional time migration velocity analysis as explained above. Such effective seismic velocities may be represented by $V_{\mathit{eff\,seismic}}$. RMS or effective well velocities (vertical RMS or effective velocities) can also be derived from data sources such as sonic (acoustic) well logs, wellbore vertical seismic profiles or check shot surveys, any or all of which can be obtained from one or more wellbores drilled through the subsurface, preferably within or proximate to the area defined by the seismic survey. Such effective well velocities can be represented by $V_{\mathit{eff\,well}}$. At 18 in FIG. 2, a relationship between $V_{\mathit{eff\,seismic}}$ and $V_{\mathit{eff\,well}}$ can be defined. In the present example, such relationship may be assumed to be linear and expressed as follows:

$$V_{\mathit{eff\text{-}well}} = A + B \cdot V_{\mathit{eff\text{-}seismic}} \quad (3)$$

The parameters A and B in equation (3) above may be estimated at the geodetic location of each well, for example by using a best linear fit between $V_{\mathit{eff\,well}}$ and $V_{\mathit{eff\,seismic}}$. The parameters A and B thus determined can then be used to predict what the $V_{\mathit{eff\,well}}$ would be at any other geodetic location within the seismic survey area from the $V_{\mathit{eff\,seismic}}$ at such geodetic location. The predicted $V_{\mathit{eff\,well}}$ velocities may then be transformed to NMO interval velocities, $V_{nmo}$, to obtain an initial model of $V_{nmo}$ with respect to depth. The predicted $V_{\mathit{eff\,well}}$ velocities can also be transformed, at 20 in FIG. 2, into vertical interval velocities, $V_o$, to obtain an initial model for $V_o$ with respect to depth.

Using the initial depth based estimates of $V_{nmo}$ and $V_o$ determined as explained above, and using equation (1) explained in the Background section herein, an initial model for the parameter δ with respect to depth can then be obtained. The foregoing is shown at 22A in FIG. 2.

Method 2 for initially estimating δ with respect to depth: At any particular geodetic location in the seismic survey area for which well data are available, the depth of formation "tops" (upper boundary of a formation layer in the subsurface) may be defined with respect to seismic travel time from, for example, a sonic (acoustic) log, a vertical seismic profile or a check shot survey (collectively, "well data"). Similarly, the depths of the same formation tops may be defined from depth migrated seismic data (e.g., migrated after stack) assuming isotropic subsurface formations ("seismic data"). As shown at 22B in FIG. 2, the difference between the depths defined from the seismic data and those from the well data can be used for initially estimating δ with respect to depth using the following expression:

$$\delta = \frac{\Delta z}{z} \quad (4)$$

In equation (4) Δz represents the difference between the seismic data determined formation top depths and the well data determined formation top depths. In equation (4) z represents the well data determined formation top depths.

The above procedures will provide initial interval models with respect to depth for the parameters $V_{nmo}$ and δ. An initial model for the parameter $V_o$ with respect to depth may also be obtained from the depth models of the foregoing parameters $V_{nmo}$ and δ using equation (1) as described in the Background section herein. After the initial estimates of the parameters $V_{nmo}$ and δ with respect to depth are obtained, a method according to the invention then can include 3D velocity estimation using tomography for VTI media.

A first iteration of the tomography procedure, shown at 24 in FIG. 2, can include the following. First is to calculate $V_o$ using equation (1) and the initial models with respect to depth of $V_{nmo}$ and δ obtained as explained above The tomography procedure may then be initialized by assuming that the interval anelliptic parameter is zero (η=0). The foregoing assumption implies that ε=δ, as may be readily determined from equation (2) in the Background section herein. Travel time residuals for depth migration based on the above initial assumptions can be calculated by prestack depth migrating, outputting common image depth gathers, estimating the depth residuals for each horizon in depth and calculating the travel time residuals from the depth residuals. Travel time tomography can then be performed by inversion. In the inversion in the present iteration δ is held constant, ε and $V_{nmo}$ are adjusted, and the foregoing migration, CIG generation, estimation of depth and travel time differentials are again calculated. The foregoing adjustment and recalculation is performed until the travel time differentials are minimized, for example, using the following expression:

$$\left[ \frac{\partial t}{\partial V_{nmo}} \quad \frac{\partial t}{\partial \varepsilon} \right] \left[ \begin{array}{c} \Delta V_{nmo} \\ \Delta \varepsilon \end{array} \right] = [\Delta t] \quad (5)$$

where [Δt] is a vector representing travel time residuals calculated from depth residuals determined as explained above. In some examples, damping factors λ related each of the parameter changes $V_{nmo}$ and ε may be used to stabilize and regularize the inversion in equation (5). The "parameter changes" are the increments or decrements to each of $V_{nmo}$ and ε used in the tomography inversion. A damped inversion procedure may be implemented using the following expression:

$$\left[ \begin{array}{cc} \frac{\partial t}{\partial V_{nmo}} & \frac{\partial t}{\partial \varepsilon} \\ \lambda_{V_{nmo}} & 0 \\ 0 & \lambda_{\varepsilon} \end{array} \right] \left[ \begin{array}{c} \Delta V_{nmo} \\ \Delta \varepsilon \end{array} \right] = \left[ \begin{array}{c} \Delta t \\ 0 \\ 0 \end{array} \right] \quad (6)$$

λ values in equation (6) may be defined as follows:

$$\lambda = \frac{\sigma_d}{\sigma_m} \quad (7)$$

In equation (6) λ is the damping factor, $\sigma_d$ is the standard deviation of the difference between the observed and calculated travel time residuals and $\sigma_m$ is the standard deviation of the model parameter ($V_{nmo}$ or ϵ) changes used in the inversion procedure. Note that as the number of iterations increases, the size of the changes to the model parameters should successively decrease in each iteration if the inversion converges. Convergence implies that $\sigma_m$ decreases, and consequently λ increases, providing stability to the tomographic inversion.

Optionally one may apply variable weights to the travel time residuals and the partial derivatives in equation (5) or (6) as a function of the value of offset (distance between source and receiver position) represented by each seismic data trace.

The next element in the procedure is to update the $V_o$, $V_{nmo}$ and η model values with respect to depth using equations (1) and (2) and using the updated parameters $V_o$ and ϵ determined as explained above with reference to equations (5) and (6). The values of δ with respect to depth, which were initially fixed in the present iteration of tomographic inversion are used in the foregoing updating of the $V_o$, $V_{nmo}$ and η model values. The foregoing is shown at 26 in FIG. 2.

Next, at 28 in FIG. 2, the horizon (layer) depths can be recalculated using the following expression:

$$Z_{new,i} = \sum_{j=1}^{j=i} dz \frac{V_{o_{new-mig,j}}}{V_{o_{old-mig,j}}} \quad (8)$$

Where $V_{o\ new-mig,\ j}$ represents the subsequent vertical velocity as derived in the present iteration for the jth horizon (formation layer). $V_{o\ old-mig,\ j}$ represents the prior vertical velocity as derived in the prior iteration for the jth horizon and dz is the sampling interval in the depth.

Then, in a second iteration of the tomographic inversion process, and as shown at 30 in FIG. 2, a first element is to prestack depth migrate the seismic data using the updated values of $V_o$, $V_{nmo}$ and η obtained in the first iteration as explained above. Next is to output common image depth gathers, estimate the depth residuals for each horizon, and calculate the travel time residual for each horizon based on the depth residual for each horizon. The process then can include performing travel time tomography by maintaining ϵ at a constant value for each horizon, adjusting δ and $V_{nmo}$, and minimizing the time residuals, such as can be performed using the following expression.

$$\left[ \frac{\partial t}{\partial V_{nmo}} \quad \frac{\partial t}{\partial \delta} \right] \left[ \begin{array}{c} \Delta V_{nmo} \\ \Delta \delta \end{array} \right] = [\Delta t] \quad (9)$$

Additionally, damping factors λ for each of the parameter changes $\Delta V_{nmo}$ and Δδ may be used to stabilize the inversion in solving equation (9). Damped inversion may be performed using an expression such as the following:

$$\left[ \begin{array}{cc} \frac{\partial t}{\partial V_{nmo}} & \frac{\partial t}{\partial \delta} \\ \lambda_{V_{nmo}} & 0 \\ 0 & \lambda_\delta \end{array} \right] \left[ \begin{array}{c} \Delta V_{nmo} \\ \Delta \delta \end{array} \right] = \left[ \begin{array}{c} \Delta t \\ 0 \\ 0 \end{array} \right] \quad (10)$$

where λ may be defined as follows:

$$\lambda = \frac{\sigma_d}{\sigma_m} \quad (11)$$

In equation (11) λ is the damping factor, $\sigma_d$ is the standard deviation of the difference between the observed and calculated travel time residuals and $\sigma_m$ is the standard deviation of the model parameter changes. Note that as the number of iterations increases, the size of the successive changes to the model parameters should decrease if the inversion converges. Convergence implies that $\sigma_m$ decreases, and consequently λ increases, providing stability to the tomographic inversion.

Optionally one may apply variable weights to the travel time residuals and the partial derivatives in the sensitivity matrix in equation (9) or (10) as a function of the small, mid and large offsets.

The next element in the tomography procedure is to update the $V_o$, $V_{nmo}$ and η values using equations (1) and (2) and using the updated parameters $V_o$, and δ. The parameter ϵ with respect to depth is fixed in the present iteration.

The next element in the procedure is to update the horizon depths using equation (8) as explained above.

The entire tomography inversion procedure thus explained, beginning with the first iteration (constant δ) may then be repeated, except that now the η model values will be those obtained in the second iteration explained above, rather than η=0. After repeating the first iteration using constant δ values and updating the ϵ values, the second iteration explained above, in which ϵ values are maintained and the δ values are adjusted, may then be repeated.

As shown at 32 in FIG. 2, the above procedure, including the first and second iterations of the tomography procedure may be repeated until stable values for δ and ϵ are obtained. The values of δ and ϵ thus obtained may be used to calculate values of the interval anelliptic parameter with respect to depth. The values of all the foregoing parameters thus determined may be stored in a computer readable medium or displayed, as will be explained below with reference to FIG. 4.

Figure 3A:
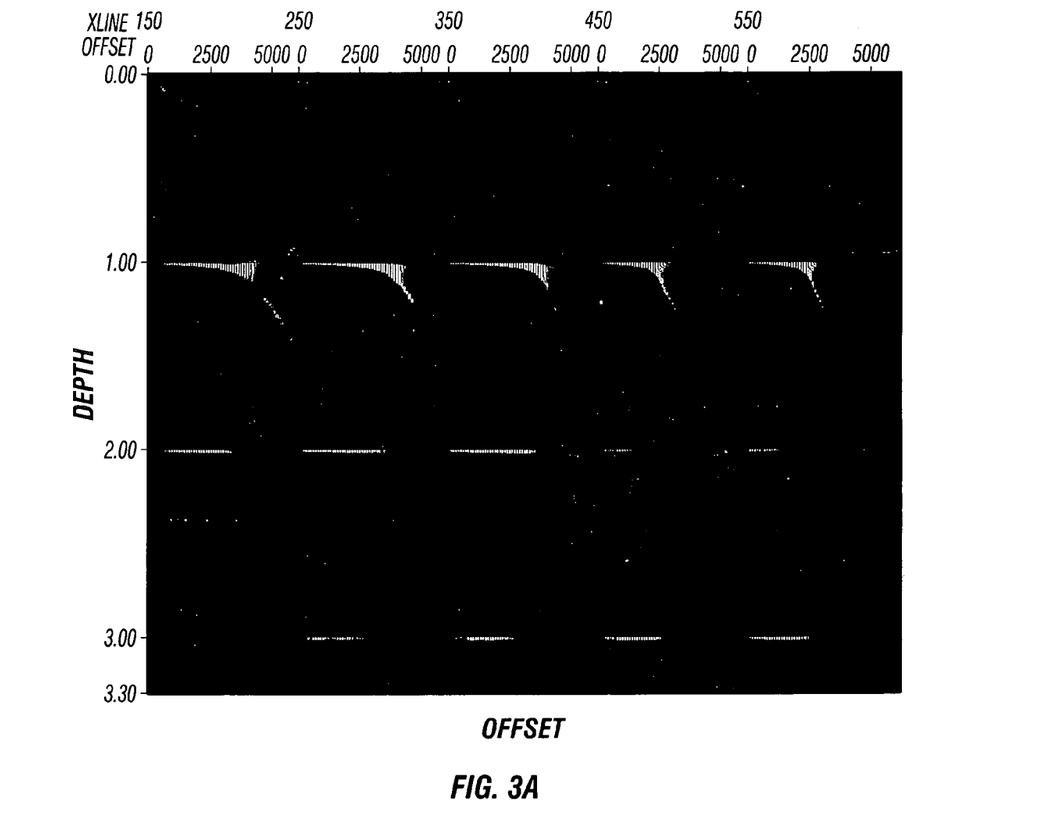
FIGS. 3A through 3C show common image gathers for a prestack depth migration process according to the invention
Figure 3B:
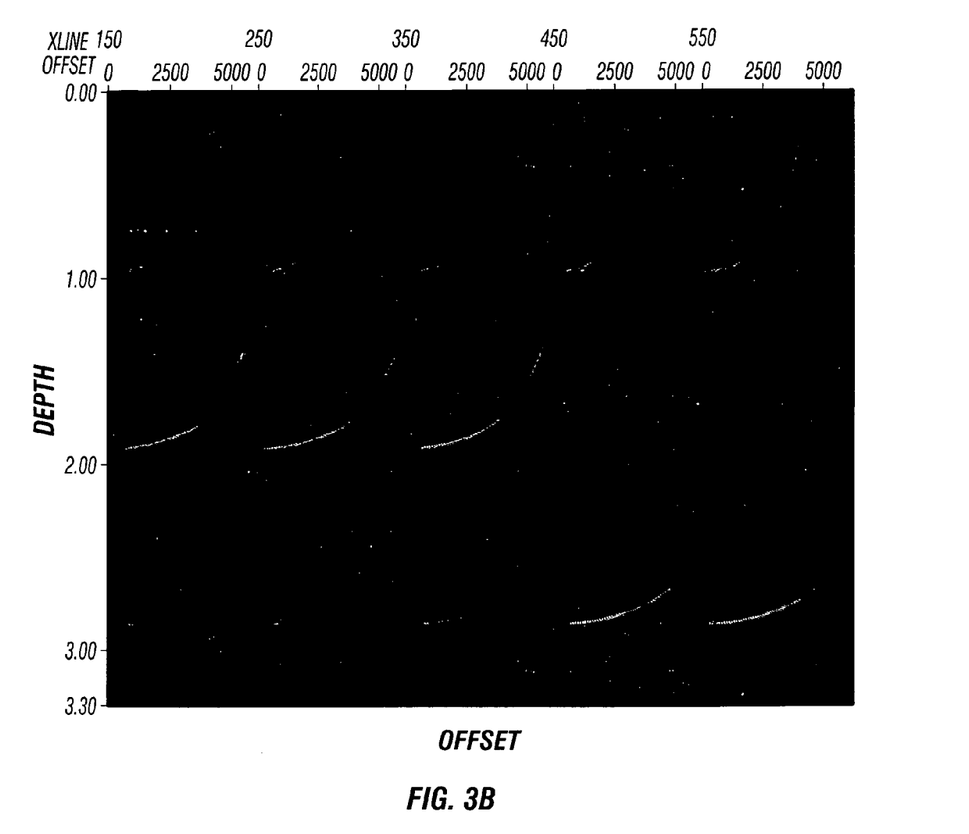
Figure 3C:
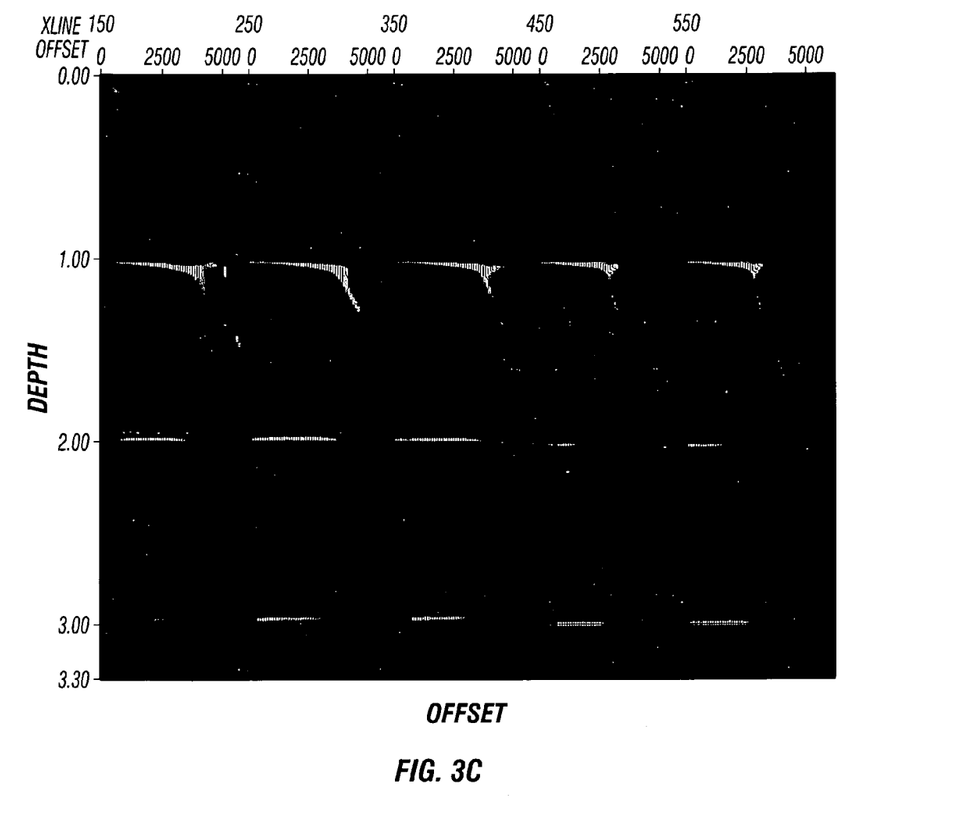

Examples of results of prestack depth migration using a method according to the invention will be explained with reference to FIGS. 3A through 3C. FIG. 3A shows common image depth gathers (CIGs) made using Kirchhoff prestack depth migration using known or assumed values for $V_{nmo}$, $V_o$ and η. Flatness of the common image gathers is indicative that the velocities and interval anelliptic parameters are substantially correct. FIG. 3B shows CIGs made using Kirchhoff prestack depth migration for the initial model of $V_{nmo}$, $V_o$ and η. FIG. 3C shows CIGs generated for the model of $V_{nmo}$, $V_o$ and η after the fourth iteration of the tomography procedure explained above with reference to FIG. 2. It should be noted that $V_{nmo}$, $V_o$ and η in the above explained procedure are obtained in the present example by modeling $V_o$ and Thomsen's parameters in the tomography procedure. It is to be understood that prestack depth migration techniques known in the art other than Kirchhoff migration may be used in other implementations, for example beam migration.

Figure 4:
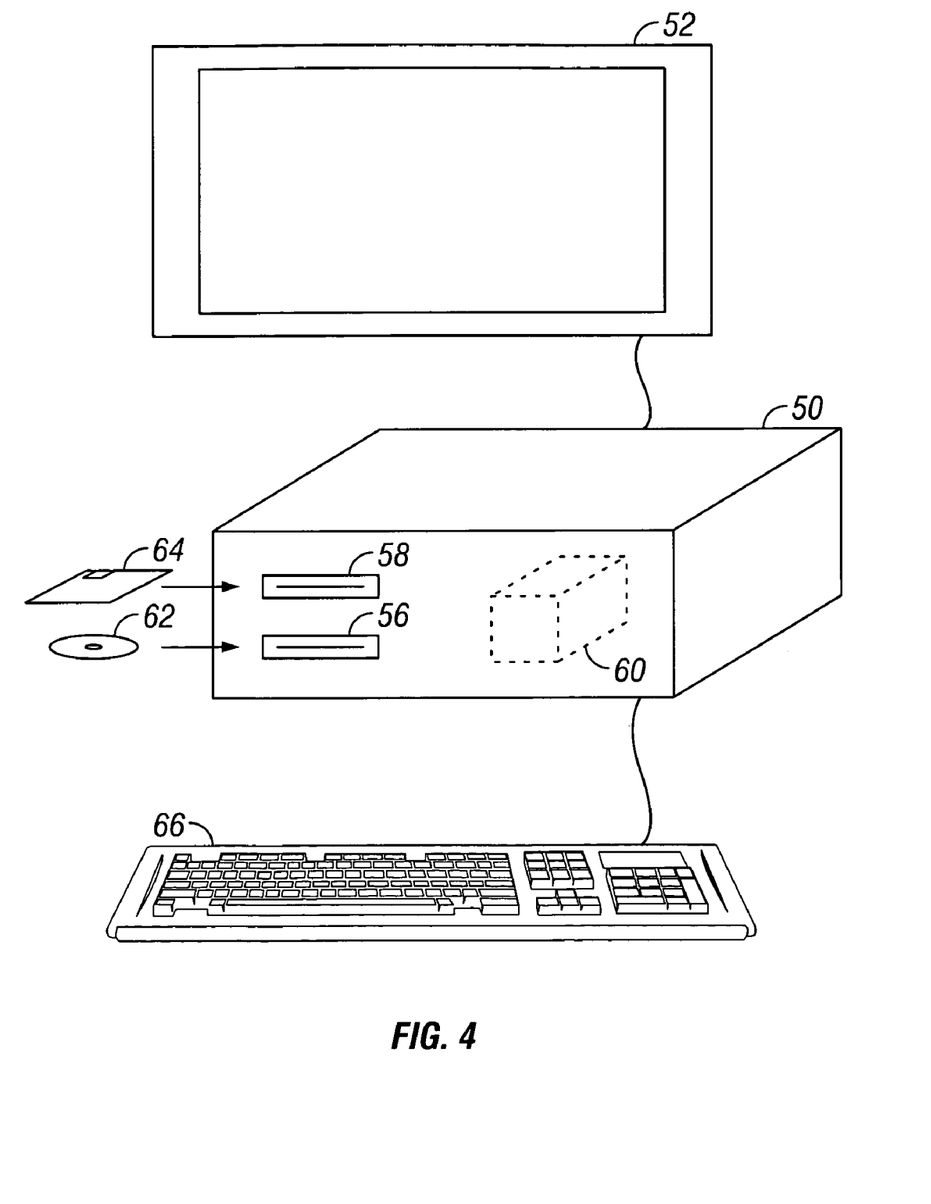
FIG. 4 shows a programmable computer and computer readable media to explain one aspect of the invention.

In another aspect, the invention relates to computer programs stored in computer readable media. Referring to FIG. 4, the foregoing process as explained with respect to FIG. 1 can be embodied in computer-readable code stored on a computer readable medium, such as floppy disk 64, CD-ROM 62 or magnetic hard drive (not shown separately) readable in a respective floppy disk drive 58 and CD-ROM drive 56 forming part of a general purpose programmable computer 50. The computer 50, as known in the art, includes a central processing unit 60, a user input device such as a keyboard 66 and a user display 52 such as a flat panel LCD display or cathode ray tube display. According to this aspect of the invention, the computer readable medium includes logic operable to cause the computer to execute steps as set forth above and explained with respect to FIG. 2. Values of the various parameters calculated as explained above with reference to FIG. 2 may be stored in any of the various computer readable media explained above, or may be displayed on the display 52.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating seismic velocities in vertically transversely isotropic media, comprising:
    generating an initial estimate of vertical interval velocity and interval normal moveout velocity with respect to depth from seismic data acquired by actuating a seismic energy source at a plurality of positions above subsurface formations to be evaluated and detecting reflected seismic energy at a plurality of seismic receivers disposed above the formations;
    generating an initial estimate of a first anisotropy parameter with respect to depth, the first anisotropy parameter related to the interval normal moveout velocity and the interval vertical velocity;
    generating an initial estimate with respect to depth of a second anisotropy parameter, the second anisotropy parameter related to the first anisotropy parameter and an interval anelliptic parameter;
    performing on a processor a first tomographic inversion with respect to the interval normal moveout velocity and the second anisotropy parameter at a constant value of the first anisotropy parameter until travel time differentials reach minimum values;
    first adjusting layer depths on a processor with the initial estimate of vertical interval velocity and interval normal moveout velocity with respect to depth from seismic data;
    using values of the second anisotropy parameter determined in the first tomographic inversion, performing on a processor a second tomographic inversion of interval normal moveout velocity and the first anisotropy parameter with respect to depth;
    second adjusting on a processor the first adjusted layer depths, interval normal moveout velocities and interval vertical velocities and calculating interval anelliptic parameters from the second tomographic inversion; and
    at least one of storing and displaying the second adjusted layer depths, interval normal moveout velocities and calculated interval anelliptic parameters.

2. The method of claim 1 wherein at least one of the first tomographic inversion and the second tomographic inversion comprises damping.

3. The method of claim 2 wherein a damping coefficient is related to a standard deviation of calculated travel time residuals with respect to a standard deviation of model value perturbations used in the at least one of the first and second tomographic inversion.

4. The method of claim 1 wherein the initial estimate of vertical interval velocity and interval normal moveout velocity with respect to depth is determined by Kirchhoff prestack time migration of seismic data.

5. The method of claim 4 wherein the Kirchhoff prestack depth migrated seismic data is further processed by isotropic tomographic inversion.

6. The method of claim 1 wherein the initial estimate of the first anisotropy parameter with respect to depth is generated by relating an effective seismic velocity with respect to depth from the seismic data to an effective seismic velocity with respect to depth determined from measurements made in a wellbore.

7. The method of claim 1 wherein the initial estimate of the first anisotropy parameter with respect to depth is generated by comparing formation layer boundary depths determined from seismic data to formation layer boundaries determined from measurements made in a wellbore.

8. The method of claim 1 wherein the generating an initial estimate of the second anisotropy parameter with respect to depth comprises setting the second anisotropy parameter equal to the first anisotropy parameter.

9. The method of claim 1 wherein the first anisotropy parameter, the second anisotropy parameter and the anelliptic parameter are related by the expression:

$$\eta = \frac{\varepsilon - \delta}{1 + 2\delta}$$

wherein $\delta$ represents the first anisotropy parameter, $\varepsilon$ represents the second anisotropy parameter and $\eta$ represents the anelliptic parameter.

10. The method of claim 1 wherein the interval normal moveout velocity, the interval vertical velocity and the first anisotropy parameter are related by the expression $V_{nmo} = V_o \sqrt{1+2\delta}$ wherein $V_{nmo}$ represents the interval normal moveout velocity, $V_o$ represents the interval vertical velocity and $\delta$ represents the first anisotropy parameter.

11. A computer readable storage medium with an executable program stored thereon having logic which instructs a programmable computer to perform steps comprising:
    generating an initial estimate of vertical interval velocity and interval normal moveout velocity with respect to depth from seismic data;
    generating an initial estimate of a first anisotropy parameter with respect to depth, the first anisotropy parameter related to the interval normal moveout velocity and the interval vertical velocity;
    generating an initial estimate with respect to depth of a second anisotropy parameter, the second anisotropy parameter related to the first anisotropy parameter and an interval anelliptic parameter;
    performing a first tomographic inversion with respect to the interval normal moveout velocity and the second anisotropy parameter at a constant value of the first anisotropy parameter until travel time differentials reach minimum values;

first adjusting layer depths in the initial estimate of vertical interval velocity and interval normal moveout velocity with respect to depth from seismic data;

using values of the second anisotropy parameter determined in the first tomographic inversion, performing a second tomographic inversion of interval normal moveout velocity and the first anisotropy parameter with respect to depth;

second adjusting the first adjusted layer depths, interval normal moveout velocities and interval vertical velocities and calculating interval anelliptic parameters from the second tomographic inversion; and at least one of storing and displaying the second adjusted layer depths, interval normal moveout velocities and calculated interval anelliptic parameters.

12. The computer readable storge medium of claim 11 wherein at least one of the first tomographic inversion and the second tomographic inversion comprises damping.

13. The computer readable storge medium of claim 12 wherein a damping coefficient is related to a standard deviation of calculated travel time residuals with respect to a standard deviation of model value perturbations used in the at least one of the first and second tomographic inversion.

14. The computer readable storge medium of claim 11 wherein the initial estimate of vertical interval velocity and interval normal moveout velocity with respect to depth is determined by Kirchhoff prestack time migration of seismic data.

15. The computer readable storge medium of claim 14 wherein the Kirchhoff prestack depth migrated seismic data is further processed by isotropic tomographic inversion.

16. The computer readable storge medium of claim 11 wherein the initial estimate of the first anisotropy parameter with respect to depth is generated by relating an effective seismic velocity from the seismic data with respect to depth to an effective seismic velocity with respect to depth determined from measurements made in a wellbore.

17. The computer readable storge medium of claim 11 wherein the initial estimate of the first anisotropy parameter with respect to depth is generated by comparing formation layer boundary depths determined from seismic data to formation layer boundaries determined from measurements made in a wellbore.

18. The computer readable storge medium of claim 11 wherein the generating an initial estimate of the second anisotropy parameter with respect to depth comprises setting the second anisotropy parameter equal to the first anisotropy parameter.

19. The computer readable storge medium of claim 11 wherein the first anisotropy parameter, the second anisotropy parameter and the anelliptic parameter are related by the expression:

$$\eta = \frac{\varepsilon - \delta}{1 + 2\delta}$$

wherein $\delta$ represents the first anisotropy parameter, $\varepsilon$ represents the second anisotropy parameter and $\eta$ represents the anelliptic parameter.

20. The computer readable storge medium of claim 11 wherein the interval normal moveout velocity, the interval vertical velocity and the first anisotropy parameter are related by the expression $V_{nmo} = V_o \sqrt{1+2\delta}$ wherein $V_{nmo}$ represents the interval normal moveout velocity, $V_o$ represents the interval vertical velocity and $\delta$ represents the first anisotropy parameter.

21. A method for estimating seismic velocities in vertically transversely isotropic media, comprising:

acquiring seismic data by actuating a seismic energy source at a plurality of positions above subsurface formations to be evaluated and detecting seismic energy at a plurality of seismic receivers disposed above the formations;

generating an initial estimate of vertical interval velocity and interval normal moveout velocity with respect to depth from the seismic data;

generating an initial estimate of a first anisotropy parameter with respect to depth, the first anisotropy parameter related to the interval normal moveout velocity and the interval vertical velocity;

generating an initial estimate with respect to depth of a second anisotropy parameter, the second anisotropy parameter related to the first anisotropy parameter and an interval anelliptic parameter;

performing on a processor a first tomographic inversion with respect to the interval normal moveout velocity and the second anisotropy parameter at a constant value of the first anisotropy parameter until travel time differentials reach minimum values;

first adjusting layer depths on a processor with the initial estimate of vertical interval velocity and interval normal moveout velocity with respect to depth from seismic data;

using values of the second anisotropy parameter determined in the first tomographic inversion, performing on a processor a second tomographic inversion of interval normal moveout velocity and the first anisotropy parameter with respect to depth;

second adjusting on a processor the first adjusted layer depths, interval normal moveout velocities and interval vertical velocities and calculating interval anelliptic parameters from the second tomographic inversion; and at least one of storing and displaying the second adjusted layer depths, interval normal moveout velocities and calculated interval anelliptic parameters.

22. The method of claim 21 wherein at least one of the first tomographic inversion and the second tomographic inversion comprises damping.

23. The method of claim 22 wherein a damping coefficient is related to a standard deviation of calculated travel time residuals with respect to a standard deviation of model value perturbations used in the at least one of the first and second tomographic inversion.

24. The method of claim 21 wherein the initial estimate of vertical interval velocity and interval normal moveout velocity with respect to depth is determined by Kirchhoff prestack time migration of seismic data.

25. The method of claim 24 wherein the Kirchhoff prestack depth migrated seismic data is further processed by isotropic tomographic inversion.

26. The method of claim 21 wherein the initial estimate of the first anisotropy parameter with respect to depth is generated by relating an effective seismic velocity with respect to depth from the seismic data to an effective seismic velocity with respect to depth determined from measurements made in a wellbore.

27. The method of claim 21 wherein the initial estimate of the first anisotropy parameter with respect to depth is generated by comparing formation layer boundary depths determined from seismic data to formation layer boundaries determined from measurements made in a wellbore.

28. The method of claim 21 wherein the generating an initial estimate of the second anisotropy parameter with respect to depth comprises setting the second anisotropy parameter equal to the first anisotropy parameter.

29. The method of claim 21 wherein the first anisotropy parameter, the second anisotropy parameter and the anelliptic parameter are related by the expression:

$$\eta = \frac{\varepsilon - \delta}{1 + 2\delta}$$

wherein $\delta$ represents the first anisotropy parameter, $\varepsilon$ represents the second anisotropy parameter and $\eta$ represents the anelliptic parameter.

30. The method of claim 21 wherein the interval normal moveout velocity, the interval vertical velocity and the first anisotropy parameter are related by the expression $V_{nmo} = V_o \sqrt{1+2\delta}$ wherein $V_{nmo}$ represents the interval normal moveout velocity, $V_o$ represents the interval vertical velocity and $\delta$ represents the first anisotropy parameter.

* * * * *